United States Patent
Cervantes

(10) Patent No.: US 6,698,772 B1
(45) Date of Patent: Mar. 2, 2004

(54) STROLLER STAND

(76) Inventor: Carma Dee Cervantes, P.O. Box 222, Novato, CA (US) 94948

( * ) Notice: Subject to any disclaimer, the term of this patent is extended or adjusted under 35 U.S.C. 154(b) by 0 days.

(21) Appl. No.: 10/128,739

(22) Filed: Apr. 20, 2002

(51) Int. Cl.⁷ .................................................. B62B 9/12
(52) U.S. Cl. ............................. 280/47.35; 280/33.992; 280/33.996; 280/649
(58) Field of Search ........................ 280/33.992, 33.996, 280/304.1, 304.5, 32.7, 656, 647, 649, 650, 47.19, 47.35, 47.38

(56) References Cited

U.S. PATENT DOCUMENTS

| | | | | |
|---|---|---|---|---|
| 2,556,121 A | * | 6/1951 | Thomas | 280/304.1 |
| 3,834,726 A | * | 9/1974 | Hobza | 280/32.7 |
| 3,877,723 A | * | 4/1975 | Fahey et al. | 280/656 |
| 4,119,331 A | * | 10/1978 | Jackson | 280/656 |
| 4,305,601 A | * | 12/1981 | Berge | 280/304.1 |
| 4,484,755 A | * | 11/1984 | Houston | 280/304.1 |
| 4,706,975 A | * | 11/1987 | Arena et al. | 280/33.992 |
| 5,658,002 A | * | 8/1997 | Szot | 280/304.1 |
| 5,794,957 A | * | 8/1998 | Mendon | 280/304.1 |
| 5,882,022 A | * | 3/1999 | Convertini et al. | 280/47.38 |
| D428,367 S | * | 7/2000 | Lundh | D12/133 |
| 6,422,634 B2 | * | 7/2002 | Lundh | 296/97.21 |
| 6,540,238 B2 | * | 4/2003 | Yang | 280/32.7 |

* cited by examiner

*Primary Examiner*—Brian L. Johnson
*Assistant Examiner*—Jeffrey J Restifo
(74) *Attorney, Agent, or Firm*—Risto A. Rinne, Jr.

(57) ABSTRACT

An apparatus for use with umbrella types of folding strollers includes a platform with two casters disposed under opposite rear corners thereof. A pair of members are attached to the platform and extend vertically a predetermined distance from two opposite front corners. The pair of members each include a ninety degree radius turn and continue to extend in a direction away from the rear of the platform. The pair of members each terminate in a loop, at least one of the loops having an axial offset wherein an end thereof is disposed further away from a center of the apparatus than is the remainder of the loop. A rod with an offset weight at a first end is provided. The main longitudinal axis of the rod includes a jog at an opposite second end. The rod can be inserted through the loop having the axial offset only if the offset weight is held vertically above the main longitudinal axis of the rod. The loops are disposed within a frame structure of a stroller and the rod is inserted through the loops and is released.

10 Claims, 2 Drawing Sheets

STROLLER STAND

BACKGROUND OF THE INVENTION

1. Field of the Invention

The present invention, in general, relates to carriages and, more particularly, to mobile stands that are adapted for attachment to an infant type of a stroller.

Parents and caregivers use strollers to transport infants. As the infant develops sufficiently to bear his or her own weight by standing upright using their feet and legs (i.e., when the infant is capable of load-bearing), the infant will lose tolerance for protracted periods of confinement in a recumbent position in a stroller.

This causes problems for the parent or caregiver who must balance their need to shop, for example, with the needs of the infant to stand upright. If the infant is left too long in a supine position the infant is apt to become restless in the stroller tossing and turning about, possibly also vocalizing their objections to the situation. This can cause stress for the parent or caregiver as well as for those in the immediate proximity.

Also, there is little space for the transport of items in most strollers. This forces the parent or caregiver to carry some of the items that are needed or which have been acquired, for example, groceries.

In order to meet the need of allowing an infant to stand erect and also of providing a platform for the placement of necessary or acquired items, platforms have been devised that attach to a stroller. These known types of devices are described in greater detail hereinafter.

However, the known types of devices are limited in that they are adapted for use with large non-folding carriage types of strollers and they do not adapt well for use with the smaller highly portable types of strollers that are popular for use when shopping and for accomplishing other tasks away from home.

This class of strollers is often referred to as "umbrella" strollers because they fold, similar to an umbrella into a compact substantially longitudinal tubular type of a structure for transport and they open up into a small lightweight viable stroller. They are also inexpensive, adding even further to their popularity.

Umbrella strollers have a substantially tubular reinforcing frame structure that includes several pivot points. The pivot points bind the members together and allow them to pivot about a plurality of axes from a closed position, adapted for transport of the umbrella stroller into an open position, adapted for the placement of an infant therein.

There are no known stroller stands that are well adapted for use with portable folding umbrella strollers, as is the instant inventive apparatus, that overcome the prior art problems.

It is desirable to be able to attach a stroller stand securely to the rear of a folding type of a stroller and to do so quickly. It is also desirable to be able to detach a stroller stand from the rear of a folding type of a stroller and to do so quickly.

It is further desirable that the stroller stand be securely fastened to the stroller. If separation were to inadvertently occur, there is the possibility of injury to the infant whom might be standing on the stroller stand at the time separation occurs.

Furthermore, prior types of stroller stands tend to be heavy, which is fine for use with the larger carriage types of strollers that are not widely used in portable applications. Also, the prior types of stands cannot be quickly and also securely attached to the stroller. A compromise of either speed or secure attachment is required with all prior types of stroller stands.

It is also desirable to include as low a platform as possible for use with an umbrella type of a stroller. A low platform is more stable, less likely to topple the stroller should an infant lean, and keeps the infant as low as possible to the surface of the ground. This can lessen the possibility of injury occurring to the infant, should the infant happen to fall, as especially young infants are apt to do quite naturally and frequently as they develop balance.

However, umbrella types of strollers have a frame structure that does not generally include any convenient attachment point and certainly none that are low to the ground.

Accordingly, there exists today a need for a stroller stand that is adapted for use with folding types of "umbrella" strollers and which helps to ameliorate the above described difficulties.

Clearly, such an apparatus would be a useful and desirable device.

2. Description of Prior Art

Stroller stands are, in general, known. For example, the following patents describe various types of these devices:

U.S. Pat. No. 5,882,022 to Convertini, et al., Mar. 16, 1999; and

U.S. Des. Pat. No. 0,428,367 to Lundh, Jul. 18, 2000.

Furthermore, the applicant has conducted a search of products for sale on the Internet, and has found a model called the "JUNIOR RIDER" under the brand of "BABY BJORN" that appears to either be based or otherwise to be similar to the above noted design patent. It is also referred to on the web page as the "KIDDY BOARD".

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a stroller stand that is adapted for use with folding umbrella types of strollers.

It is also an important object of the invention to provide a stroller stand that can be quickly attached to an umbrella type of a stroller.

Another object of the invention is to provide a stroller stand that can be quickly detached apart from an umbrella type of a stroller.

Still another object of the invention is to provide a stroller stand that is secure when it is attached to an umbrella type of a stroller.

Still yet another object of the invention is to provide a stroller stand that is lightweight.

Yet another important object of the invention is to provide a stroller stand that includes a low platform.

Still yet another important object of the invention is to provide a stroller stand that is adapted for use with virtually all known types of umbrella strollers.

Briefly, a stroller stand that is constructed in accordance with the principles of the present invention has a platform that substantially defines a planar surface. The platform preferably includes two pivoting casters disposed at a rear on opposite corners of the platform for optimum stability. A pair of members disposed on opposite front corners of the platform extend vertically upward for a predetermined distance and then experience a ninety degree radius turn. Each of the pair of members then extends in a substantially parallel orientation with respect to the plane of the platform in a direction that is generally toward the front of the stand. Each of the pair of members terminates in a loop, at least one loop including an axial offset. The loops are positioned so as to extend into the frame of an opened umbrella type of a stroller and a rod is inserted through the loops to secure the stand to the stroller frame. The rod includes a ninety degree offset at a first end with a weight disposed at the end of the offset. A small jog is provided at an opposite second end of the rod. Before the rod can be inserted through the loops (or removed therefrom) it must be disposed with the offset held in a vertical orientation with the weight disposed above a main longitudinal axis of the rod. If it were disposed otherwise, the axial offset in the loop(s) would create a bind and prevent insertion (or removal). Once the loops are positioned so as to be disposed intermediate frame members of the stroller and after the rod is inserted through the loops, the rod is then released. The weight at the end of the offset causes the rod to rotate about the longitudinal axis approximately 180 degrees, with the weight seeking its equilibrium downward, toward the plane of the platform (i.e., near the floor). The axial offset prevents removal of the rod in this attitude. This provides for very rapid attachment and prevents any inadvertent detachment from occurring. To detach the stroller stand from the stroller, the weight is grasped and is rotated approximately 180 degrees back into the upright position. The rod is then pulled out of the loops, thereby detaching the stroller stand apart from the stroller.

DETAILED DESCRIPTION OF THE INVENTION

Figure 1:
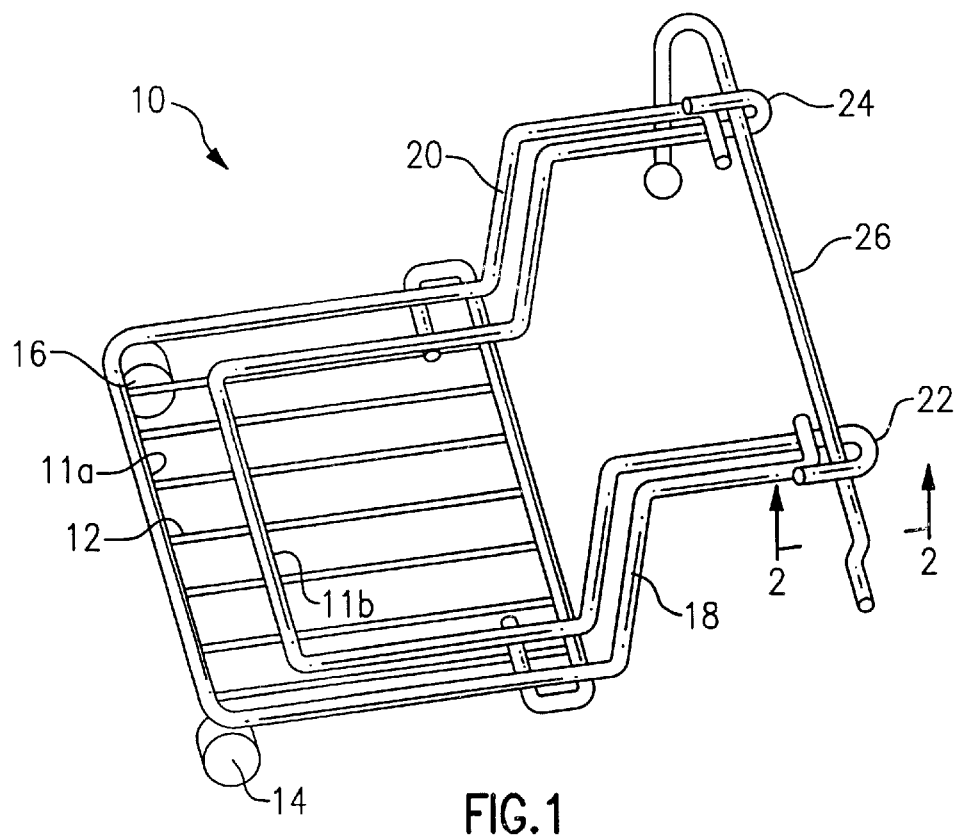
FIG. 1 is a view in perspective of a stroller stand.

Referring on occasion to all of the DRAWINGS and in particular to FIG. 1 is shown, a stroller stand, identified in general by the reference numeral 10.

The stroller stand 10 includes a platform 12 that substantially defines a planar surface that, during use, is parallel with respect to a surface of the ground.

The stroller stand 10, as shown, includes a frame F having two strands 11a, 11b of heavy gauge wire that surround the platform 12 with lighter gauge cross members disposed throughout. The first of the two strands 11a is disposed along the outside perimeter of the platform 12 and the second of the two strands 11b traverses across an intermediate portion of the platform 12.

This type of a design provides strength with little weight. It also allows dirt and debris, such as would be found on the shoes of an infant, to fall through the platform 12 onto the surface. The second of the two strands 11b is preferably disposed on the top surface of the platform 12 so that it extends slightly above a plane of the platform 12 that is created by the lighter gauge cross members. Accordingly, the raised second of the two strands 11b provides a additional traction for a child's footing (not shown) or a cargo (not shown). If desired, the first of the two strands 11a may also be similarly disposed above the plane of the platform 12 that is created by the lighter gauge cross members.

A pair of pivoting casters 14, 16 are disposed under opposite corners at a rear of the platform 12.

The two strands of heavy gauge wire combine together to provide a pair of members, one of the pair on each of opposite front corners of the platform 12, that each extend vertically upward, this portion (i.e., that is not disposed in the plane of the platform 12) being identified by reference numerals 18, 20.

The pair of members 18, 20 each include a ninety degree radius turn and continue to extend parallel to the plane of the platform 12 and elevated therefrom in a direction that is generally toward the front of the stroller stand 10.

Each of the pair of members 18, 20 terminates in a loop 22, 24, at least one of the loops 22 including an axial offset, as is described in greater detail hereinafter. As each of the pair of members 18, 20 includes two heavy gauge wires, only one of the wires is required to terminate in the loop 22, 24.

The remaining wire of each of the pair of members 18, 20 preferably includes a ninety degree turn toward the center of the platform 12 and it then passes through the respective loop 22, 24. While many variations are possible, this arrangement provides improved structural integrity for the stroller stand 10.

The design also allows the plane of the platform 12 to be disposed below the upper ends of the pair of members 18, 20 (i.e., the elevated plane of the upper ends of the members 18, 20). This orients the platform 12 close to the surface which provides optimum stability and safety to an infant (not shown) whom might be standing on the platform 12 of the stroller stand 10.

The only limiting factor as to how low the platform 12 is disposed is determined by the size and location of the casters 14, 16. It is possible to use smaller casters (not shown) or to extend the casters 14, 16 out and away (not shown) from the platform 12, if the platform 12 is desired to be lowered further.

Figure 2:
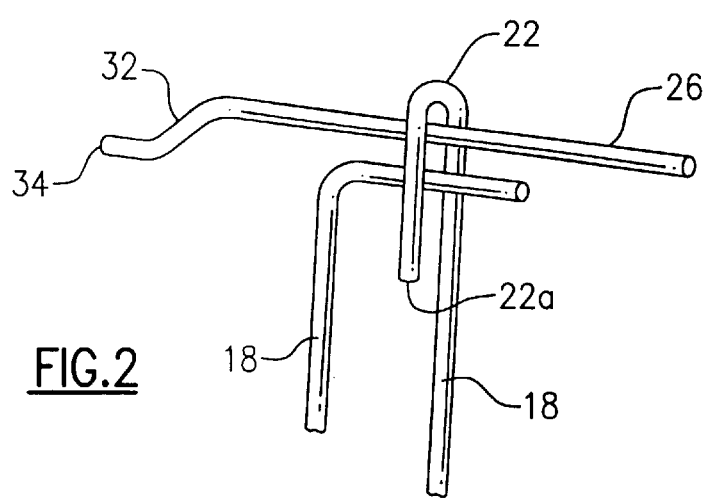
FIG. 2 is detail view of one of the loops of the stroller stand of FIG. 1.
Figure 4:
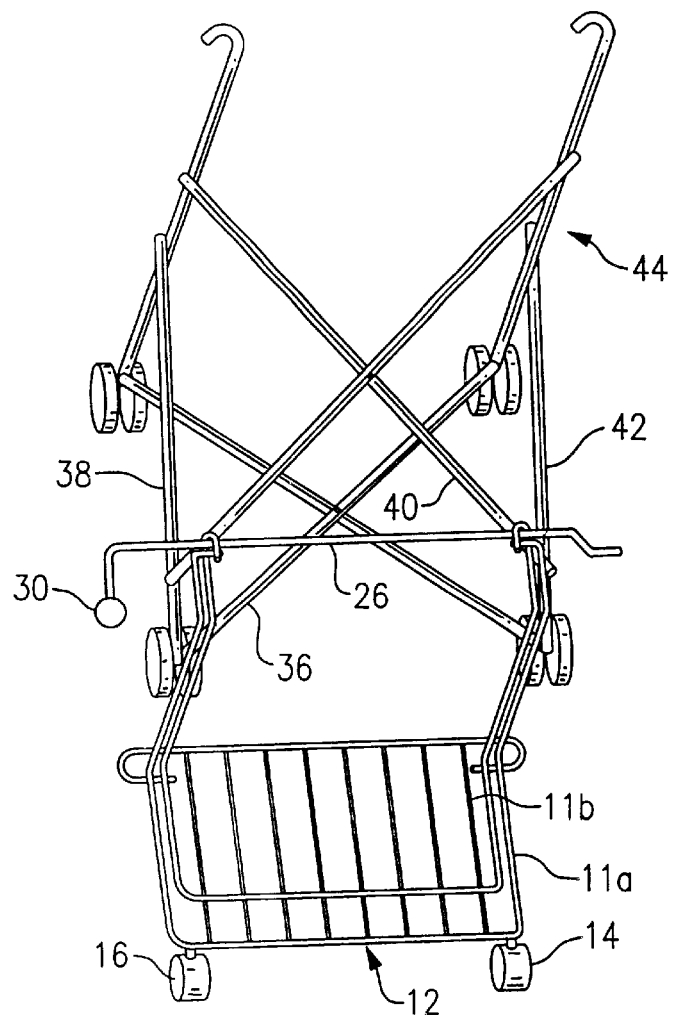
FIG. 4 is a view in perspective of the stroller stand of FIG. 1 attached to an umbrella type of a stroller, only a portion of the frame of the stroller being illustrated.

Referring momentarily to FIG. 2, the loop 22 includes an axial offset in which an end thereof 22a is disposed further away from center of the stand 10 than is the remainder of the loop 22.

The axial offset is used to secure the stand 10 during use, as is described in greater detail hereinafter.

Figure 3:
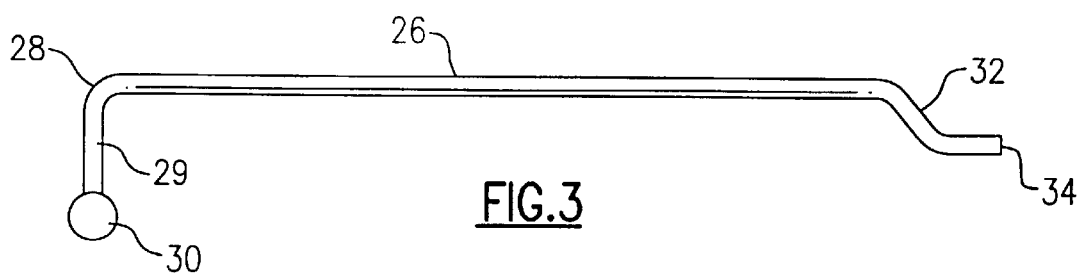
FIG. 3 is a plan view of a rod used with the stroller stand of FIG. 1.

A rod 26 is provided that includes a ninety degree offset 29 at a first end 28 (See FIG. 3) and continues in a perpendicular direction with respect to a main longitudinal axis of the rod 26 for a short distance and terminates with a weight 30 that is disposed (i.e. attached) at the end of the offset 29.

A small jog 32 is included a short distance before a second end 34 of the rod 26. The small jog 32 introduces a displacement in the main longitudinal axis of the rod 26 with a new longitudinal axis that is parallel to the main longitudinal axis of the rod 26 but offset a small distance. The new longitudinal axis extends for a short distance.

To use the stand 10, the loops 22, 24 are disposed intermediate a pair of frame members 36, 38 and 40, 42 of a stroller, identified in general by the reference numeral 44.

The offset 29 is disposed upright so that the weight is above the longitudinal axis of the rod 26 and the rod 26 is inserted through the first loop 24 and then through the remaining loop 22 (with the axial offset). It is possible, of course, to include axial offsets with both loops 22, 24, however at least one axial offset in at least one of the loops 22, 24 is required for proper securement.

The axial offset of the loop 22 can be further described by stating that the end thereof 22a of the loop 22 is displaced longitudinally so as to be disposed further away from the center of the stand 10 along the main longitudinal axis of the rod 26 than is a remaining portion of the loop 22. The remaining portion of the loop 22 includes a smooth, spiral-like transition in from the end thereof 22a.

After insertion through the loops 22, 24, the rod 26 is released. The weight 30 automatically, by force of gravity, causes the rod 26 to rotate so that the weight 30 is now disposed below the main longitudinal axis of the rod 26.

In this position (i.e., with the weight 30 down), the rod 26 cannot be withdrawn through the loop 22 having the axial offset because the jog 32 binds with the axial offset.

Therefore, to ensure proper attachment the small jog 32 end of the rod 26 is inserted first through the loop 24 not having the axial offset and then lastly through the loop 22 with the axial offset.

Once the rod 26 is rotated 180 degrees so the weight 30 is disposed vertically above the main longitudinal axis of the rod 26, the angles of the jog 32 cooperate with the axial offset to easily and effortlessly allow passage of the rod 26 through the loop 22.

The rod 26 is accordingly prevented from accidentally being dislodged from the loops 22, 24. This provides for easy attachment of the stroller stand 10 to the stroller 44 and easy removal therefrom, providing the removal is deliberate so as to ensure that the rod 26 is first rotated one-half turn prior to its removal.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A stroller stand, comprising:
   (a) a platform, said platform substantially defining a planar surface;
   (b) a pair of casters attached to a rear of said platform and adapted to support said rear of said platform above a surface;
   (c) a pair of members attached to said platform, each of said pair of members extending vertically from said platform for a predetermined distance and then including a radius and extending further in a direction that is generally away from said rear of said platform; and
   (d) means for attaching, said means for attaching adapted to secure said pair of members to a stroller;
   wherein said means for attaching includes a loop disposed at an end of each of said pair of members and wherein each of said loops is adapted for insertion intermediate a portion of a frame of said stroller, and including a rod, said rod adapted for insertion through said loops and for securing said stroller stand to said stroller and wherein at least one of said loops includes an axial offset whereby an end of said at least one of said loops is displaced outward axially with respect to longitudinal axis of said rod when said rod is disposed in said loops as compared with a remaining portion of said at least one of said loops and wherein said rod is adapted for insertion through said at least one of said loops when said rod is disposed in a first attitude and is not adapted for insertion through said at least one of said loops when said rod is disposed in a second attitude, said second attitude including displacing said rod approximately 180 degrees of rotation around a main longitudinal axis of said rod.

2. The stroller stand of claim 1 wherein said radius includes a ninety degree radius.

3. The stroller stand of claim 1 wherein said rod includes an offset at a first end thereof and a weight attached to said offset, said weight adapted to rotate said rod into said second attitude when said rod is disposed in said loops.

4. The stroller stand of claim 3 wherein said rod includes a small jog at a second end thereof, said small jog including a displacement in said main longitudinal axis of said rod sufficient to provide a second longitudinal axis of said rod that is in parallel orientation with respect to said main longitudinal axis and is displaced therefrom.

5. The stroller stand of claim 4 wherein said small jog allows the passage of said rod through said at least one of said loops when said rod is disposed in said first attitude and prevents the passage of said rod through said at least one of said loops when said rod is disposed in said second attitude.

6. The stroller stand of claim 1 wherein said platform includes a substantially wire frame structure.

7. The stroller stand of claim 6 wherein said wire frame structure includes a first type of wire and a second type of wire, said first type of wire being of a larger gauge than second type of a wire and providing a base upon which to support said second type of wire.

8. The stroller stand of claim 7 wherein said wire frame structure includes a sufficient spacing intermediate said first and said second types of wires sufficient to allow a debris item that is smaller in thickness than the spacing intermediate any of said first and second types of wires to pass through said platform.

9. A stroller stand, comprising:
   (a) a platform, said platform substantially defining a planar surface;
   (b) a pair of casters attached to a rear of said platform and adapted to support said rear of said platform above a surface;
   (c) a pair of members attached to said platform, each of said pair of members extending in a direction that is generally away from said rear of said platform; and
   (d) means for attaching, said means for attaching adapted to secure said pair of members to a stroller and including a loop disposed at an end of each of said pair of members, and wherein at least one of said loops includes an axial offset whereby an end of said at least one of said loops is displaced axially away from a center of, said stroller stand as compared with a remaining portion of said at least one of said loops;
   wherein said pair of loops are adapted to receive a rod therein, and wherein said rod is adapted to cooperate with said axial offset whereby said rod is adapted to pass through said at least one of said loops when said rod is disposed in a first attitude and is prevented from passing through said at least one of said loops when said rod is disposed in a second attitude, said second attitude including a radial offset as compared to said first attitude.

10. The stroller stand of claim 9 wherein said radial offset includes an angle of approximately 180 degrees.

* * * * *